(12) United States Patent
Gillespie

(10) Patent No.: US 6,915,995 B2
(45) Date of Patent: Jul. 12, 2005

(54) UNDERBODY MOUNTING SYSTEM

(75) Inventor: John Gillespie, Chicago, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 0 days.

(21) Appl. No.: 10/283,790

(22) Filed: Oct. 30, 2002

(65) Prior Publication Data

US 2004/0084586 A1 May 6, 2004

(51) Int. Cl.$^7$ .............................................. E04G 3/00
(52) U.S. Cl. ................... 248/278.1; 248/918; 248/920; 248/921; 248/922; 248/923; 361/681; 361/682; 361/683; 296/37.7
(58) Field of Search ..................... 348/837; 312/7.2, 312/248, 245; 248/278.1, 919, 920, 921, 922, 923, 924, 279.1, 274.1, 414; 361/681, 682, 683; 296/37.7; 218/286.1, 291.1, 487

(56) References Cited

U.S. PATENT DOCUMENTS

| | | | |
|---|---|---|---|
| 2,862,328 A | | 12/1958 | Wadsworth ..................... 45/83 |
| 3,433,444 A | * | 3/1969 | Smith ....................... 248/279.1 |
| 3,436,046 A | | 4/1969 | Valeska ....................... 248/284 |
| 4,034,946 A | * | 7/1977 | Zimmer, Jr. .............. 248/183.2 |
| 4,438,458 A | | 3/1984 | Munscher .................... 358/254 |
| 4,706,919 A | | 11/1987 | Soberalski et al. ....... 248/281.1 |
| 4,824,159 A | | 4/1989 | Fluharty et al. ............ 296/37.7 |
| 4,836,478 A | | 6/1989 | Sweere ........................ 248/1 E |
| 5,173,686 A | | 12/1992 | Fujihara ..................... 340/700 |
| 5,201,896 A | * | 4/1993 | Kruszewski .............. 248/278.1 |
| 5,321,579 A | | 6/1994 | Brown et al. ............... 361/681 |
| 5,330,415 A | | 7/1994 | Storti et al. .................... 600/22 |
| 5,388,032 A | | 2/1995 | Gill et al. .................... 364/146 |
| 5,400,993 A | | 3/1995 | Hamilton ..................... 248/278 |
| 5,537,290 A | | 7/1996 | Brown et al. ............... 361/681 |
| 5,549,264 A | | 8/1996 | West .......................... 248/157 |
| 5,611,513 A | | 3/1997 | Rosen .................... 248/222.11 |
| 5,812,368 A | | 9/1998 | Chen et al. ................. 361/681 |
| 5,946,055 A | | 8/1999 | Rosen ......................... 348/837 |
| 5,967,479 A | | 10/1999 | Sweere et al. ......... 248/280.11 |
| 5,992,809 A | | 11/1999 | Sweere et al. ............ 248/278.1 |
| 6,019,332 A | | 2/2000 | Sweere et al. ............ 248/284.1 |
| 6,056,248 A | | 5/2000 | Ma .......................... 248/124.1 |
| 6,059,255 A | * | 5/2000 | Rosen et al. ................ 292/140 |
| 6,113,046 A | | 9/2000 | Wang ....................... 248/278.1 |
| 6,146,523 A | | 11/2000 | Kenley et al. .............. 210/143 |
| 6,157,418 A | * | 12/2000 | Rosen ......................... 348/837 |
| 6,175,502 B1 | | 1/2001 | Schaerer et al. ............ 361/727 |
| 6,186,459 B1 | * | 2/2001 | Ma .......................... 248/276.1 |
| D438,850 S | | 3/2001 | Rosen ....................... D14/132 |
| 6,199,810 B1 | * | 3/2001 | Wu et al. ................. 248/291.1 |
| 6,246,449 B1 | * | 6/2001 | Rosen ......................... 348/837 |
| 6,256,837 B1 | * | 7/2001 | Lan et al. ..................... 16/334 |
| 6,336,618 B1 | | 1/2002 | Barber ..................... 248/284.1 |
| 6,347,433 B1 | * | 2/2002 | Novin et al. .................. 16/367 |
| 6,361,012 B1 | * | 3/2002 | Chang ......................... 248/324 |
| 6,378,830 B1 | * | 4/2002 | Lu .......................... 248/278.1 |
| 6,412,848 B1 | * | 7/2002 | Ceccanese et al. ......... 296/37.7 |
| 6,416,027 B1 | * | 7/2002 | Hart ........................... 248/324 |
| 6,427,288 B1 | * | 8/2002 | Saito ............................ 16/361 |
| 6,529,123 B1 | * | 3/2003 | Paul, Jr. ................... 340/425.5 |
| 6,557,812 B2 | * | 5/2003 | Kutzehr et al. ............. 248/476 |

\* cited by examiner

*Primary Examiner*—Kimberly Wood
(74) *Attorney, Agent, or Firm*—Foley & Lardner

(57) ABSTRACT

A mounting device for a display device comprising a mounting bracket coupled to the underside of a body and a pivot bracket coupled to the mounting bracket. A pivot bracket is coupled to the mounting bracket at one end thereof. A tilt block is coupled to the pivot bracket and is rotatable about an axis substantially parallel to the body. A carriage bolt is coupled to the tilt block and is rotatable about an axis substantially perpendicular to the body. A display system bracket is operatively connected to the carriage bolt. An interface bracket is connected to the display system bracket and is capable of engaging a display device.

26 Claims, 5 Drawing Sheets

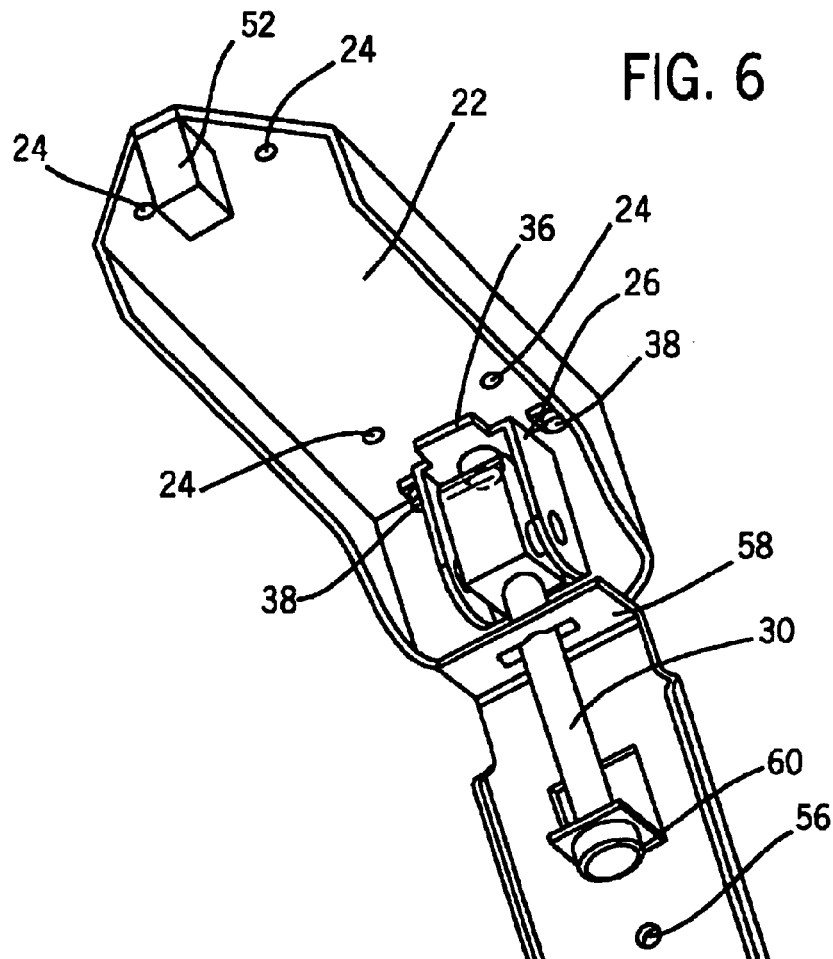

UNDERBODY MOUNTING SYSTEM

FIELD OF THE INVENTION

The present invention is directed to a system for mounting a display unit to the underside of a body such as cabinets, shelves or similar structures.

BACKGROUND OF THE INVENTION

Mounting systems for televisions monitors and liquid crystal display (LCD) units have been used for a number of years. Mounting systems are conventionally used to position a television or LCD display unit at a particular height and position that is desired by a particular user.

In recent years, both the size and the price of LCD units have decreased dramatically. This decrease in price has resulted in a surge in popularity and sales of LCD units. With this increase in popularity, however, there has also been an increase in the number of ways in which people would like to use LCD units. For example, it has become increasingly desirable to have an LCD unit mounted on the underside of a cabinet or shelf, as opposed to resting directly or indirectly upon a desktop or tabletop. This is primarily due to the fact that a person's counter and desk space can be quite limited, therefore necessitating placement of devices such as LCD units positioned above the desk. At the same time, however, there is also a need to have the ability to remove the LCD unit from view when not in use. For example, if an LCD unit is mounted on the underside of a shelf or cabinet but remains positioned such that it is viewable 24 hours a day, then the user loses a significant amount of space that could be used for other purposes when the user is not viewing the LCD unit.

A number of underbody mounting systems have been developed in recent years, but each have significant drawbacks. For example, some underbody mounting systems permit a user to locate the display device in one of only a limited number of positions. Other underbody mounting systems do not provide the user the ability to fully retract the display device when not in use, while other underbody mounting systems have a large amount of complexity in their design, increasing the component and product cost. Furthermore other mounting devices do not provide a mechanism for fixing the position of the display device in a single retracted position without the use of hand tools.

It would therefore be desirable to develop a simple device for mounting a display unit on the underside of a body such as a cabinet or shelf, while also providing the user with the ability to fully retract the display unit when not in use and also place the display unit in a number of different positions. It also would be desirable to develop a mounting system that allows the user to fix the position of the display device in a simple manner without the use of external tools.

SUMMARY OF THE INVENTION

A mounting system in accordance with the principles of the present invention provides a simple device for mounting a display unit on the underside of a body such as a cabinet or shelf, while also providing the user with the ability to fully retract the display unit when not in use and also place the display unit in a number of different positions. A mounting system in accordance with the principles of the present invention allows the user to fix the position of the display device in a simple manner without the use of external tools.

A mounting system in accordance with the principles of the present invention comprises a mounting bracket coupled to the underside of a body and a pivot bracket coupled to the mounting bracket. A pivot bracket is coupled to the mounting bracket at one end thereof. A tilt block is coupled to the pivot bracket and is rotatable about an axis substantially parallel to the body. A carriage bolt is coupled to the tilt block and is rotatable about an axis substantially perpendicular to the body. A display system bracket is operatively connected to the carriage bolt. The display system bracket is also connected to an interface bracket that specifically allows engagement to the display device. The mounting device is capable of tilting the display device up to about twenty degrees in the forward direction and ninety degrees to a fixed, closed position. The mounting device is also capable of rotating up to about ninety degrees to the left and right and also includes a passageway through which a power cord may be placed.

BRIEF DESCRIPTION OF THE DRAWINGS

The foregoing advantages and features of the invention will become apparent upon reference to the following detailed description and the accompanying drawings, of which:

FIG. 6 is a sectional perspective view of the mounting bracket, display system bracket, and the connecting components of the underbody mounting system of FIG. 1; and FIG. 7 is a rear view of the engagement between the pivot bracket and the tilt block of the underbody mounting system of FIG. 1.

DETAILED DESCRIPTION OF THE INVENTION

Figure 4:
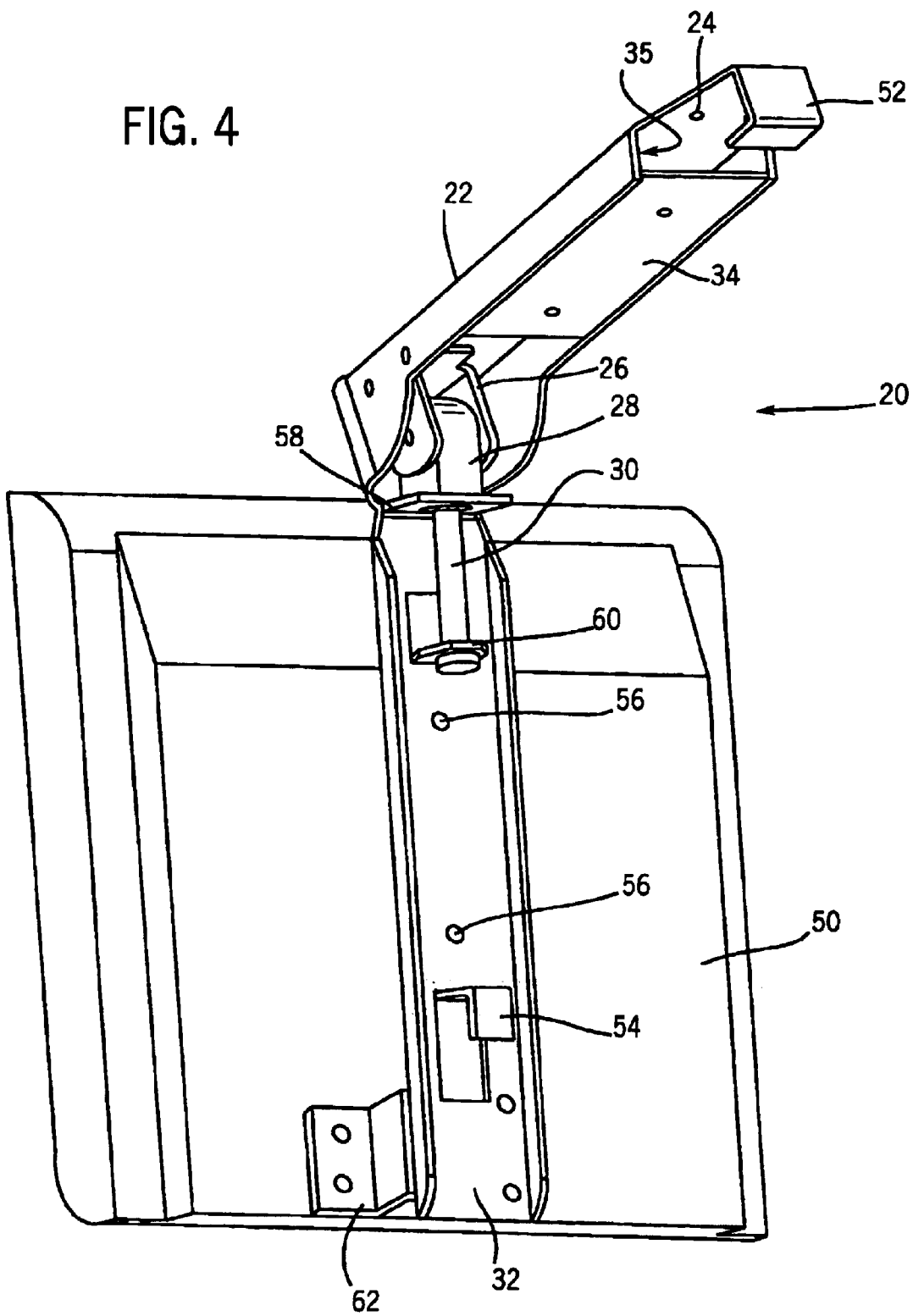
FIG. 4 is a reverse perspective view of the underbody mounting system of FIG. 2.

An underbody mounting system, according to one embodiment in accordance with the principles of the present invention, is shown generally at 20 in FIGS. 1–5. The underbody mounting system 20 comprises a mounting bracket 22 and a display system bracket 32. The mounting bracket 22 is coupled to a pivot bracket 26 which is operatively connected to a tilt block 28. The tilt block 28 is operatively connected to the display system bracket 32 by a carriage bolt 30. As shown in FIG. 4, the mounting bracket 22 includes a cover piece 34, which define a space 35 between the mounting bracket 22 and the cover piece 34. The space 35 may be used to route electrical cords, speaker cords, and/or other types of cords away from the display. This provides the user with the additional benefit of "hiding" the cords from view, providing a more efficient use of space and removing a potential obstruction or hazard from adjacent the display unit.

The mounting bracket 22 includes a plurality of mounting bracket holes 24 strategically located along the mounting bracket 22. The mounting bracket holes 24 are used to fixedly secure the mounting bracket 22 to the underside of a body such as a shelf or cabinet (not shown). A variety of types of screws or other fastening devices could be used to secure the mounting bracket 22 to the underside of the body. These devices are well known to those skilled in the art.

As shown in FIGS. 4 and 6, the mounting bracket 22 is coupled to a pivot bracket 26. Located on each side of the pivot bracket is a cover tab 38, the end of which can be seen in FIG. 5. The pivot bracket 26 includes a stop portion 36 at one end thereof. The pivot bracket 26 is rotatable relative to the mounting bracket 22. In one embodiment in accordance with the principles of the invention, the pivot bracket 26 is capable of rotating ninety degrees from center in both the clockwise and counterclockwise direction. When the pivot bracket 26 moves either about ninety degrees clockwise or about ninety degrees counterclockwise, the stop portion 36 comes into contact with one of the two cover tabs 38, preventing further movement of the pivot bracket 26. This allows the display device 50 to have a large degree of rotation, while also preventing the device cord (not shown) from becoming entangled or suffering an undue amount of stress.

As shown in FIGS. 4, 6 and 7, the pivot bracket 26 is rotatably coupled to a tilt block 28. In a preferred embodiment in accordance with the principles of the invention, the pivot bracket 26 is coupled to the tilt block 28, for example by a screw 40, which passes through both sides of the pivot bracket 26 and the tilt block 28. The pivot bracket 26 is coupled to the tilt block 28 such that the tilt block 28 is capable of rotating about an axis substantially perpendicular to the axis which the pivot bracket 26 rotates relative to the mounting bracket 22. In a preferred embodiment in accordance with the principles of the invention, a single nylon washer 44 is located on a screw 40 between one side of the pivot bracket 26 and the tilt block 28, and a pair of spring washers 42 are located on the other side of the tilt block 28 against the pivot bracket 26. A nut 46 is used to secure the screw 40 relative to the other components. The screw 40 is tightened against the nylon washer 44, the spring washers 42, the pivot bracket 26 and the tilt block 28 a sufficient amount such that the components in combination provide a built in tension for the tilt block 28 relative to the pivot bracket 26. This tension is set such that the position of the tilt block 28 will be fixed relative to the pivot bracket 26 in whatever position the display device 50 (and the tilt block 28) is placed. This results in a built-in positioning mechanism that does not require the use of external hand tools. The tension in the screw 40 is fixed and does not need to be adjusted by the user either to rotate or fix the position of the tilt block 28 relative to the pivot bracket 26.

The tilt block 28 is fixedly secured to a carriage bolt 30. The carriage bolt 30 passes through an upper portion 58 of the display system bracket 32 and couples to the display system bracket 32 at a bracket tab 60. The carriage bolt 30 is coupled to the tilt block 28 and the display system bracket 32 such that any rotation of one of the components results in a rotation of all three of the components. This permits the display system bracket 32 (along with the display device 50) to rotate at least about ninety degrees away from the mounting bracket 22.

In a preferred embodiment in accordance with the principles of the invention, the display system bracket 32 can rotate about one hundred ten degrees away from the mounting bracket 22, or about twenty degrees from an axis perpendicular to the underside of the body. The display system bracket 32 includes a plurality of display bracket holes 56 positioned in various locations thereon. A plurality of screws or other fastening devices (not shown) are capable of passing through the display bracket holes 56 to couple an interface bracket 62 to the display system bracket 32. The types and sizes of fastening devices that can be used are well known to those skilled in the art. A plurality of screws or other fastening devices (not shown) are capable of passing through the interface bracket 62 to couple the display device 50 to the display system bracket 32. In a preferred embodiment of the invention, different interface brackets 62 are used depending upon the type and model of the display device 50 that is to be used with the underbody mounting system 20 and is based upon the location of the individual holes that are formed in the back of the display device 50. The types and sizes of fastening devices that can be used are well known to those skilled in the art.

Figure 1:
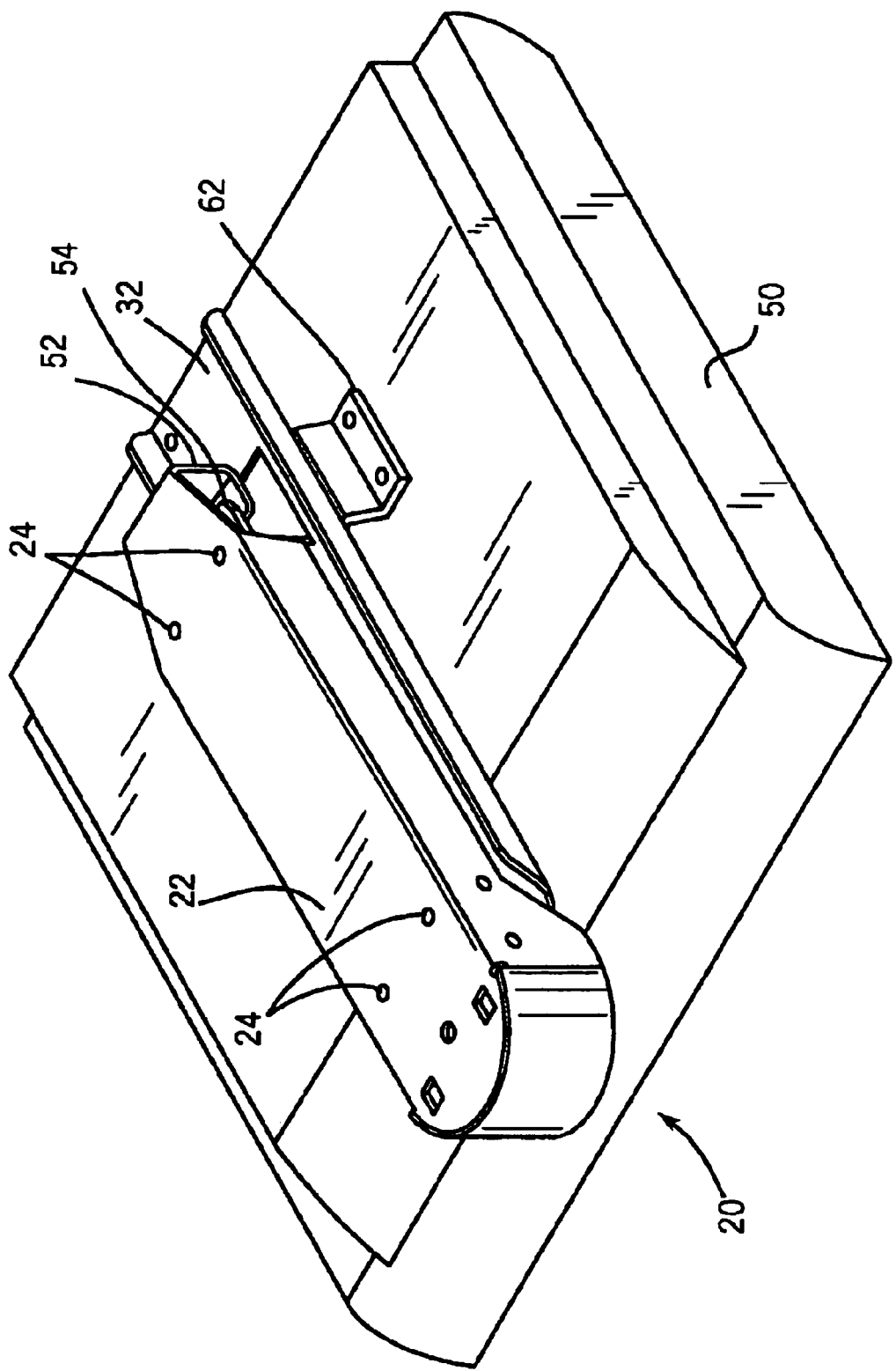
FIG. 1 is a perspective view of an underbody mounting system in an engaged position according to one embodiment in accordance with the principles of the present invention.
Figure 2:
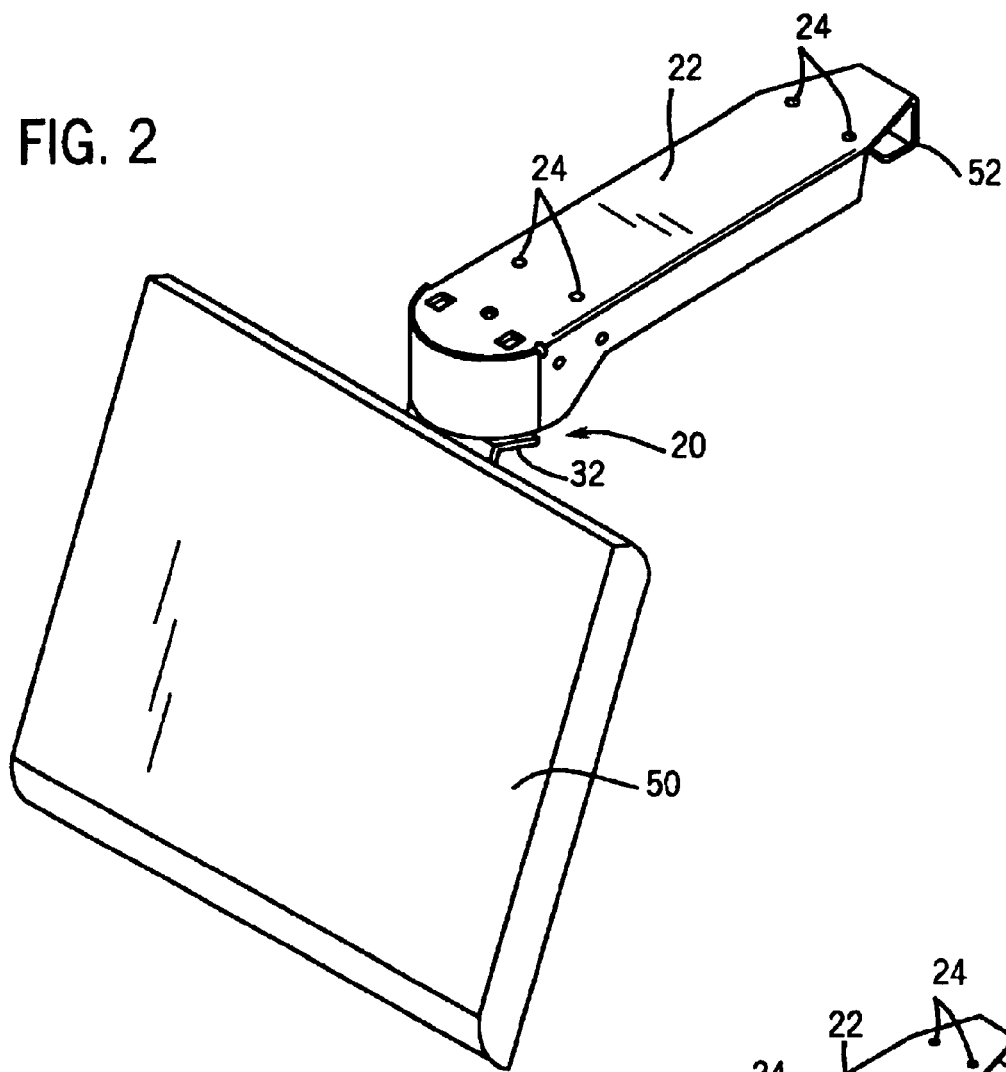
FIG. 2 is a perspective view of the underbody mounting system of FIG. 1 in a disengaged and retracted position.
Figure 3:
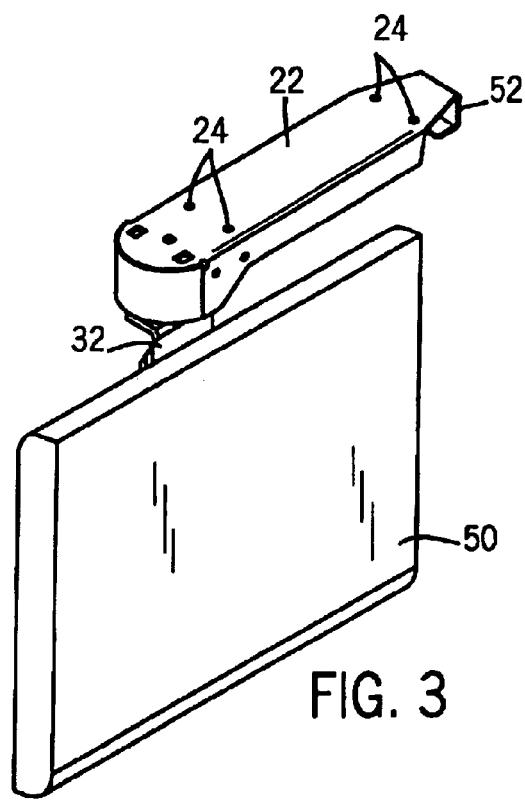
FIG. 3 is a perspective view of the underbody mounting system of FIG. 1 in a disengaged and unretracted position with the display unit rotated.
Figure 5:
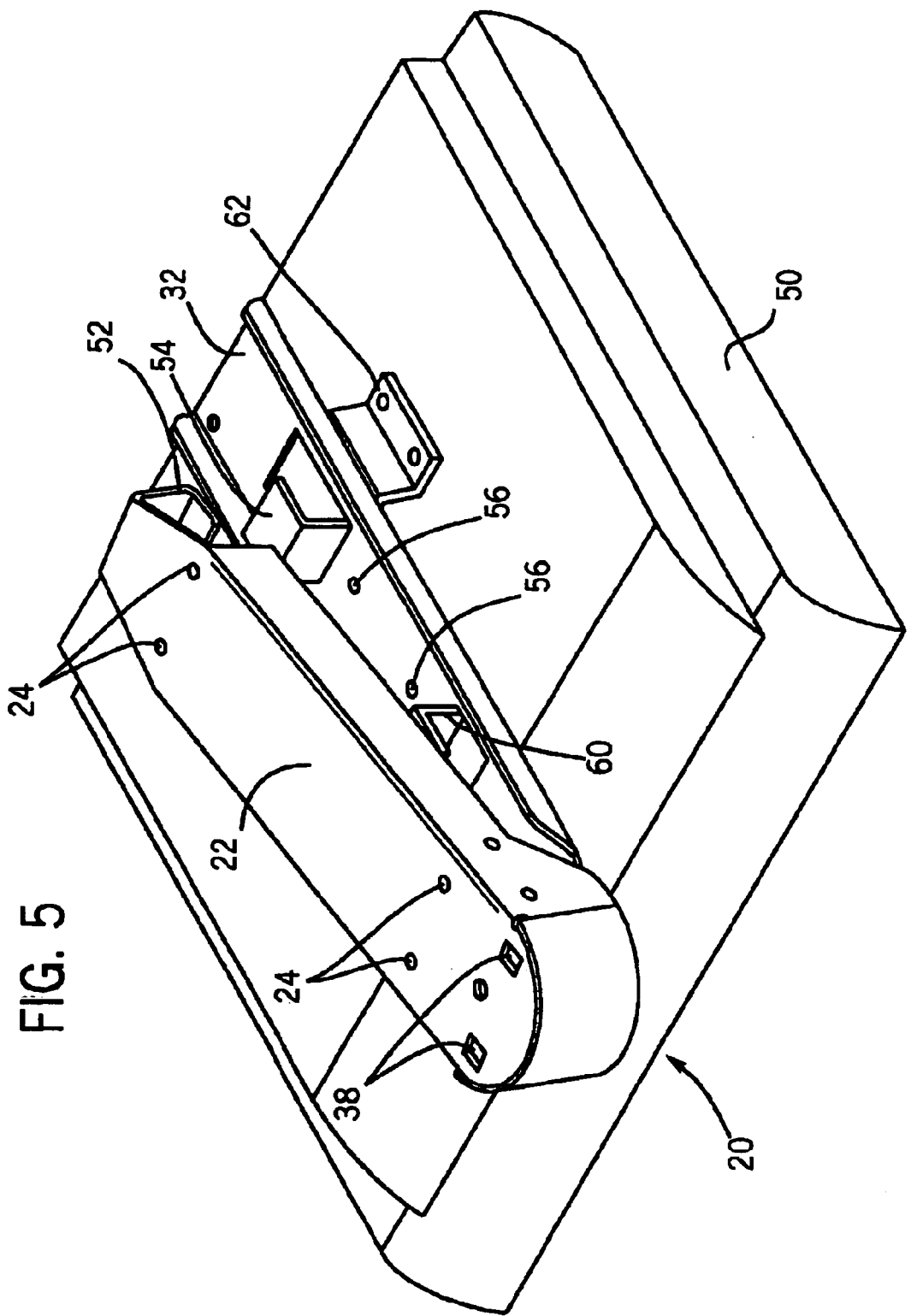
FIG. 5 is a perspective view of the underbody mounting system of FIG. 1 with the mounting bracket disengaged from the display system bracket but still in a retracted position.

In a preferred embodiment in accordance with the principles of the invention, the mounting bracket 22 includes a hook 52 and the display system bracket 32 includes a catch 54. The hook 52 and the catch 54 are positioned such that the hook 52 and the catch 54 are capable of mating with each other when the display device 50 is placed in a fully retracted and unrotated position, as shown in FIG. 1. As shown in FIG. 5, when a user desires to disengage the hook 52 from the catch 54, the display system bracket 32 is simply rotated a few degrees relative to the mounting bracket 22. Once the hook 52 and the catch 54 are disengaged from each other, the user is capable of "pulling" the display device 50 downward relative to the mounting bracket 22, placing the display device 50 in a desired position relative to the mounting bracket 22.

A design in accordance with the principles of the present invention allows the mounting bracket 22, the pivot bracket 26, the tilt block 28, the carriage bolt 30 and the display system bracket 32 all to be formed from a metallic material, such as anodized 6061 aluminum for the tilt block 28 and 1018 cold rolled steel for other components. The use of metal components reduces the wear of the assembly and helps to insure that the tilt of the display device 50 maintains its integrity after a number of cycles of use. The use of metal components also decreases the cost of manufacturing the underbody mounting system 20.

It should be understood that the above description of the invention and specific examples and embodiments, while indicating the preferred embodiments of the present invention are given by demonstration and not limitation. Many changes and modifications within the scope of the present invention may therefore be made without departing from the spirit thereof and the present invention includes all such changes and modifications.

What is claimed is:

1. A mounting device for a display device, comprising:
 a mounting bracket coupled to the underside of a body, the mounting bracket including a first mating portion;
 a pivot bracket coupled to the mounting bracket at one end thereof;
 a tilt block rotatably coupled to the pivot bracket for rotation about an axis substantially parallel to the body;
 a carriage bolt rotatably coupled to the tilt block for rotation about an axis substantially perpendicular to the body; and
 a display system bracket operatively connected to the carriage bolt, the display system bracket including a second mating portion, and
 a cover piece coupled to the mounting bracket, the cover piece and mounting bracket arranged to allow the passage of a cord therethrough,
 wherein the first mating portion removably engages the second mating portion to fix the position of the display system bracket in a fully retracted position.

2. The mounting device of claim 1, wherein the tilt block is coupled to the pivot bracket such that the display system bracket is rotatable to about twenty degrees beyond a plane substantially perpendicular to the body.

3. The mounting device of claim 1, wherein the mounting bracket comprises a plurality of stop tabs to impede the rotation of the carriage bolt.

4. The mounting device of claim 3, wherein the mounting bracket comprises two stop tabs.

5. The mounting device of claim 3, wherein carriage bolt is rotatable about ninety degrees counterclockwise and about ninety degrees clockwise about an axis substantially perpendicular to the plane when the first mating portion is disengaged from the second mating portion.

6. A mounting device for a display device, comprising:
- a mounting bracket coupled to the underside of a body, the mounting bracket including a first mating portion;
- a pivot bracket coupled to the mounting bracket at one end thereof;
- a tilt block rotatably coupled to the pivot bracket for rotation about an axis substantially parallel to the body;
- a carriage bolt rotatably coupled to the tilt block for rotation about an axis substantially perpendicular to the body;
- a display system bracket operatively connected to the carriage bolt, the display system bracket including a second mating portion, and
- a screw abutting against the pivot bracket, wherein the tension in the screw against the pivot bracket creates a constant friction between the pivot bracket and the tilt block, and wherein the first mating portion removably engages the second mating portion to fix the position of the display system bracket in a fully retracted position.

7. The mounting device of claim 6, further comprising a plurality of washers between the pivot bracket and the tilt block.

8. The mounting device of claim 6, further comprising an interface bracket coupling the display device to the display system bracket.

9. An underbody mount, comprising:
- a mounting bracket coupled to the underside of a body, the mounting bracket including a catch portion;
- a pivot bracket coupled to the mounting bracket;
- a tilt block coupled to the pivot bracket, the tilt block rotatable about an axis substantially parallel to the underside of the body;
- a carriage bolt coupled to the tilt block, the carriage bolt rotatable about an axis substantially perpendicular to the underside of the body;
- a display system bracket operatively connected to the carriage bolt and securable to a display device, the display system bracket including a hook for engaging the catch portion; and
- a screw abutting against the pivot bracket,
- wherein the tension in the screw against the pivot bracket creates a constant friction between the pivot bracket and the tilt block.

10. The underbody mount of claim 9, wherein the display system bracket is rotatable to about twenty degrees beyond a plane substantially perpendicular to the underside of the body.

11. The underbody mount of claim 10, further comprising means for concealing a portion of a cord of the display device when the display device is fastened to the display system bracket.

12. The underbody mount of claim 11, wherein the carriage bolt is rotatable about ninety degrees counterclockwise and about ninety degrees clockwise about an axis substantially perpendicular to the underside of the body when the hook is disengaged from the catch portion.

13. The underbody mount of claim 12, wherein the mounting bracket, the pivot bracket, the tilt block, the carriage bolt, and the display system bracket are formed from a metallic material.

14. The underbody mount of claim 9, further comprising a plurality of washers positioned between the pivot bracket and the tilt block.

15. The underbody mount of claim 14, wherein the tightening of the screw against the pivot bracket creates the constant friction between the pivot bracket and tilt block to inhibit the rotation of the tilt block relative to the mounting bracket.

16. The mounting device of claim 9, further comprising an interface bracket coupling the display system bracket to the display device.

17. A mounting system for a display device, the mounting system having a closed position and an open position and comprising:
- a mounting bracket for engagement with the underside of a body;
- a cover piece coupled to the mounting bracket, the cover piece and mounting bracket arranged to allow the passage of a cord therethrough;
- a pivot bracket coupled to the mounting bracket;
- a display system bracket operatively coupled to the pivot bracket;
- first rotating means for rotating the display system bracket about an axis substantially parallel to the underside of the body; and
- second rotating means for rotating the display system bracket about an axis substantially perpendicular to underside of the body.

18. The mounting system of claim 17, wherein the mounting bracket includes a first mating portion and the display system bracket includes a second mating portion, the first mating portion engaging the second mating portion when the mounting system is in a closed position.

19. The mounting system of claim 17, wherein the first rotating means permits the display system bracket to rotate about one hundred ten degrees from an engaged position.

20. The mounting system of claim 19, further comprising an screw for preventing the rotation of the first rotating means.

21. The mounting system of claim 17, wherein the second rotating means permits the display system bracket to rotate about one hundred eighty degrees about the axis substantially perpendicular to the underside of the body.

22. The mounting device of claim 17, further comprising an interface bracket coupling the display system bracket to the display device.

23. The mounting device of claim 6, wherein the tilt block is coupled to the pivot bracket such that the display system bracket is rotatable to about twenty degrees beyond a plane substantially perpendicular to the body.

24. The mounting device of claim 6, wherein the mounting bracket comprises a plurality of stop tabs to impede the rotation of the carriage bolt.

25. The mounting device of claim 24, wherein the mounting bracket comprises two stop tabs.

26. The mounting device of claim 23, wherein carriage bolt is rotatable about ninety degrees counterclockwise and about ninety degrees clockwise about an axis substantially perpendicular to the plane when the first mating portion is disengaged from the second mating portion.

* * * * *